United States Patent
Merzlikine et al.

(10) Patent No.: US 7,780,079 B2
(45) Date of Patent: Aug. 24, 2010

(54) DATA STORAGE DEVICE WITH BUILT-IN DATA PROTECTION FOR ULTRA SENSITIVE APPLICATIONS

(75) Inventors: Alexei Merzlikine, Pittsburgh, PA (US); Yiao-Tee Hsia, Wexford, PA (US)

(73) Assignee: Seagate Technology LLC, Scotts Valley, CA (US)

( * ) Notice: Subject to any disclaimer, the term of this patent is extended or adjusted under 35 U.S.C. 154(b) by 332 days.

(21) Appl. No.: 11/438,242

(22) Filed: May 22, 2006

(65) Prior Publication Data

US 2007/0271471 A1 Nov. 22, 2007

(51) Int. Cl.
*G06K 5/00* (2006.01)
(52) U.S. Cl. ........................ 235/382; 235/380
(58) Field of Classification Search ................. 235/382, 235/474, 486; 455/26.1, 421, 456; 713/171, 713/176, 182, 189, 194, 167, 155; 342/357.09, 342/357.11, 357.17
See application file for complete search history.

(56) References Cited

U.S. PATENT DOCUMENTS

| | | | |
|---|---|---|---|
| 4,325,089 A | 4/1982 | Hsu | |
| 5,610,981 A | 3/1997 | Mooney et al. | |
| 5,691,928 A | 11/1997 | Okaya et al. | |
| 5,748,083 A | 5/1998 | Rietkerk | |
| 5,821,854 A | 10/1998 | Dorinski et al. | |
| 5,925,128 A | 7/1999 | Harmon | |
| 5,959,530 A | 9/1999 | Lupien, Jr. et al. | |
| 5,987,609 A | 11/1999 | Hasebe | |
| 6,085,323 A | 7/2000 | Shimizu et al. | |
| 6,087,937 A | 7/2000 | McCarthy | |
| 6,166,688 A | 12/2000 | Cromer et al. | |
| 6,167,519 A | 12/2000 | Sonobe | |
| 6,286,102 B1 | 9/2001 | Cromer et al. | |
| 6,448,928 B1 | 9/2002 | Knox et al. | |
| 6,628,198 B2 | 9/2003 | Fieschi et al. | |
| 6,658,586 B1 | 12/2003 | Levi | |
| 6,804,699 B1 | 10/2004 | Henrie | |
| 7,165,152 B2 * | 1/2007 | Blumenau et al. | 711/152 |
| 7,178,031 B1 * | 2/2007 | Seger | 713/182 |
| 2003/0065934 A1 | 4/2003 | Angelo et al. | |
| 2003/0131255 A1 | 7/2003 | Shim | |
| 2004/0128508 A1 | 7/2004 | Wheeler et al. | |
| 2005/0044404 A1 | 2/2005 | Bhansali et al. | |

FOREIGN PATENT DOCUMENTS

| | | |
|---|---|---|
| WO | WO 00/49753 A2 | 8/2000 |
| WO | WO 00/49753 A3 | 8/2000 |

* cited by examiner

*Primary Examiner*—Daniel St.Cyr
(74) *Attorney, Agent, or Firm*—Robert P. Lenart, Esq.; Pietragallo Gordon Alfano Bosick & Raspanti, LLP

(57) ABSTRACT

An apparatus comprises a data storage medium; a remote unit; and an authorization unit for encrypting information to be stored on the storage medium and for controlling access to data stored on the data storage medium in response to the access control signals received from the remote unit. A method of controlling access to data stored on the data storage medium is also provided.

20 Claims, 2 Drawing Sheets

DATA STORAGE DEVICE WITH BUILT-IN DATA PROTECTION FOR ULTRA SENSITIVE APPLICATIONS

FIELD OF THE INVENTION

This invention relates to data storage devices, and more particularly to apparatus for protecting data stored in data storage devices.

BACKGROUND OF THE INVENTION

When a computer is lost or stolen, the cost of the information contained in it often exceeds the cost of the hardware. Such losses may negatively affect both the national security and business operations. Numerous techniques have been proposed to prevent unauthorized use of computers. Such techniques are typically directed toward preventing access to the computer, or disabling the computer in the event that the computer is stolen.

Protection against theft of computers usually involves disabling the computer and/or informing a service provider via the Internet, cellular network or GPS system. Such techniques do not prevent access to data stored on a disc drive, if for example, the drive is removed from the computer and installed in another computer. Therefore, information can still be extracted from the stolen computer's hard drive.

There is a need for a device that can prevent unauthorized access to data that is stored in a data storage medium, such as a disc drive.

SUMMARY OF THE INVENTION

This invention provides an apparatus comprising a data storage medium; a remote unit; and an authorization unit for encrypting data prior to storage of the data on a storage medium and for controlling access to data stored on the data storage medium in response to the access control signals received from the remote unit.

In another aspect, the invention provides an apparatus comprising a data storage device including a data storage medium and an authorization unit, and a remote unit controlling the authorization unit to control access to data stored on the data storage medium.

In another aspect, the invention provides a method comprising: using an authorization unit to control access to data stored on a data storage medium in response to an access control signal received from a remote unit.

DETAILED DESCRIPTION OF THE INVENTION

This invention provides a distributed data protection system, one part of which is embedded in a data storage device, such as a hard disc drive (the "component part"), and another part that operates remotely (the "remote part"), and remains under the true data owner's control in case the data storage device is stolen. In an alternative embodiment, the remote part may stay under "neutral party" control (for example, the remote unit may be controlled by a party other than the operator), and may include a location sensitive component such as a GPS system.

Figure 1:
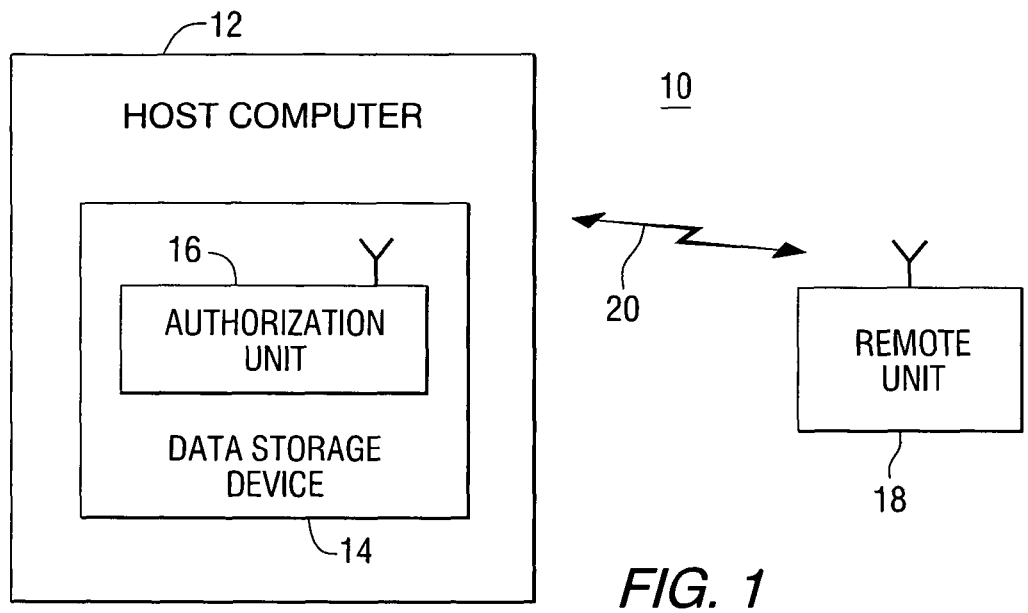
FIG. 1 is a block diagram of a computer system that includes the invention.

FIG. 1 is a block diagram of a computer system 10 that includes the invention. The system includes a computer 12 having a data storage device 14, such as a hard disc drive. An authorization unit 16 is associated with the data storage device. The authorization unit is capable of communicating with a remote unit 18. The authorization unit is integrated with the drive electronics. It can be contained within the data storage device or attached thereto. Communication between the authorization and the remote part can be accomplished via a non-computer communications link 20 (using for example wireless "external signals" such as radio, cellular, GPS, laser, etc.). The remote unit can control access to data in the storage device based on information obtained from a remote database. The remote database can be contained in the remote part or located somewhere else and simply accessed by the remote part. The database always remains under the control of the data owner.

Figure 2:
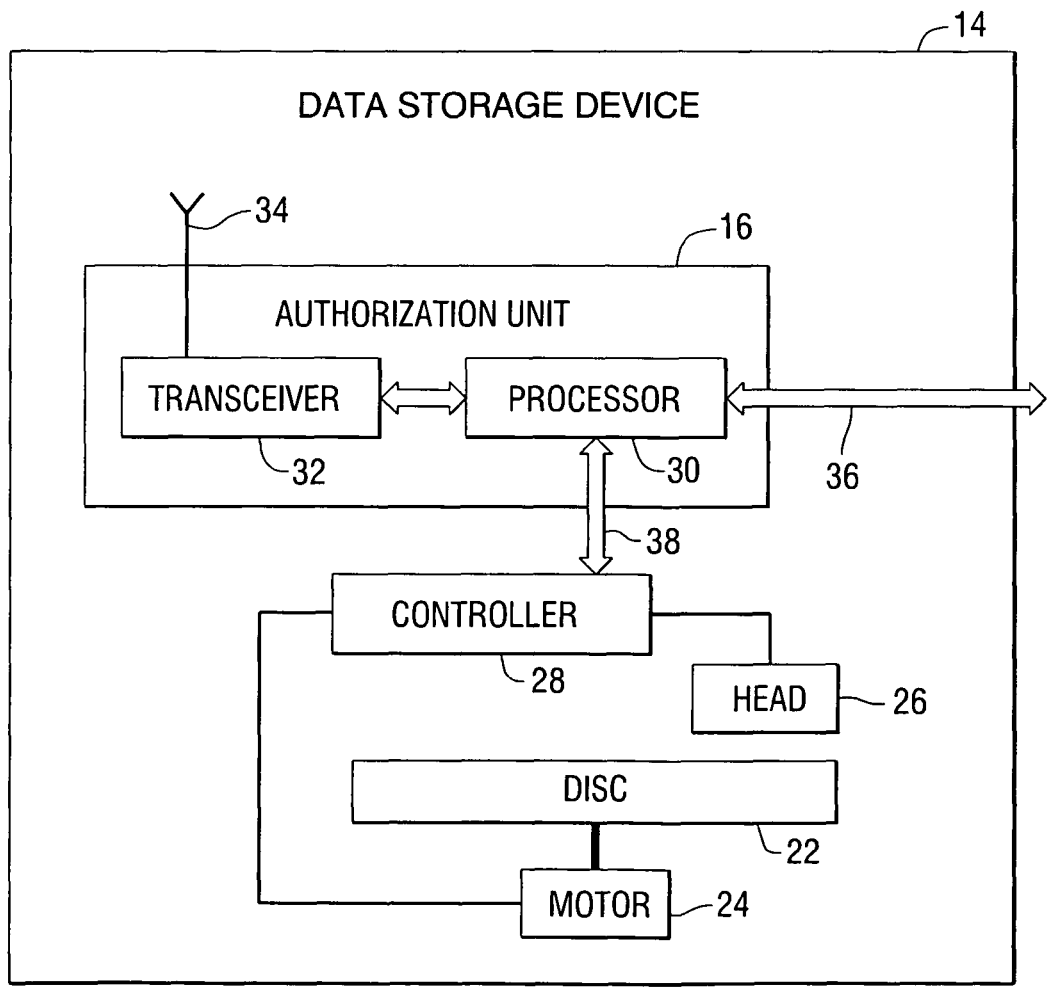
FIG. 2 is a block diagram of a data storage device constructed in accordance with the invention.

FIG. 2 is a block diagram of a data storage device 14 that includes an authorization unit 16. In this example, the data storage device is a disc drive that includes a data storage medium 22 in the form of one or more discs, a motor 24 for rotating the discs, one or more recording heads 26 for writing and/or reading data from the discs, and a controller 28 for controlling the operation of the motor and heads. The controller can include read and write circuitry and servo circuitry as is well-known in the disc drive art.

Data to be stored by the disc drive are transferred from the host computer to the encoder, which encrypts the data and passes the encrypted data to the controller for storage on the storage medium. When data is to be read from the storage medium, the controller retrieves the data and passes it to the authorization unit, which decrypts the data before sending it to the host computer.

The authorization unit includes a processor 30 that encodes information to be stored on a storage medium 22 and decodes information stored on the storage medium, and a transceiver 32 for receiving information from the remote unit, and for transmitting information about the status of the data storage device, using an antenna 34. Alternatively the transceiver could be implemented using a separate receiver and transmitter. A first interface 36 is provided for transferring data to and receiving data from a host computer. A second interface 38 is provided for transferring data to and receiving data from the controller. The remote unit may supply a key for use by the encoder.

For the purposes of this description, the data storage device will be described as a disc drive. However, it should be understood that other types of data storage devices, such as probe storage devices or solid-state memory devices could also be used in accordance with the invention.

The encoder can be, for example, an encryption device that encrypts data received from the host computer prior to the storage of such data on the storage medium, and decrypts data read from the storage medium prior to passing the data to the host computer. The encryption can be accomplished using known techniques that employ keys to perform the encryption and decryption. The keys are not permanently stored in the data storage device, but are supplied by the remote unit.

The key can be stored in the storage device on a transient basis for use during the encryption and decryption. Keys are not stored in the drive permanently (such as on the disc or in a non-volatile memory). Instead, they are loaded into the disc drive's volatile memory (RAM), and are lost when the computer containing the disc drive shuts down or loses power. To protect against the possible power interrupts (such as when computer is rebooted), the volatile memory may have a backup power source that lasts for a short time, such as a few seconds.

When the safety of the data contained in the drive is compromised (as determined by the authorization unit based on external signals, described below), the keys are destroyed. Since the keys are stored in the drive's RAM and not on the disc, this can be done very quickly by rewriting or zeroing the memory, or by powering the memory off. If an adverse party tries to prevent any protective actions by powering the device off, the decoding keys will be lost as described in the previous paragraph.

Since there is a small chance of the decoding key being intercepted during transmission, the keys can be updated and the data re-encrypted on a regular (or irregular) basis. Because each key is valid for a limited time only, its loss is less critical. The keys can be received from the remote unit via the wireless interface. Alternatively, they can be uploaded using the wired link (computer interface) when the drive can be connected to the remote unit in this fashion. For example, the latter method may be used to update the decoding keys when an aircraft carrying the drive returns to its base. The encoded data are then loaded into the authorization unit, decoded with the old key and re-encoded with the new one. The keys can be generated when requested, or can be generated earlier and stored in the remote unit.

In some embodiments, the invention can use public key encryption methods such as RSA. Public key encryption uses two different keys for encoding and decoding, respectively. Since the encoding keys cannot be used to decode the data, it is possible to store them on the disc drive without compromising safety of the data. Then, the data can be re-encoded using the new encoding keys according to the predetermined schedule.

After this, a new decoding key is required to read the data. Since the decoding key may be unavailable at the time re-encoding is scheduled, the authorization unit may encode already encrypted data. In this case, decoding can be performed recursively using several (that is, new and older) decoding keys.

In another example, the operator may be required to enter a part of the key. This key can be entered using the host computer and loaded into the authorization unit. In this case, both a key supplied by the remote unit and a key supplied by the operator are required to decode the data. This scheme allows an additional degree of protection against either intercepting the remote key or otherwise obtaining the remote key, and can be justified for the highly sensitive data.

For very sensitive applications, the authorization unit may corrupt the data in the case of emergency. When the authorization unit receives a predetermined distress signal instructing it to destroy the data, it may overwrite either particular data or the entire disc. This will prevent correct decoding in the case when an adverse party intercepts the decoding key.

The authorization unit controls the operation of the disc drive. It evaluates the safety of the environment and grants access to the database on one or more pre-set external signals. The "environment" refers to the location of the drive and the party that has physical control of the drive. The "pre-set" signals are predetermined signals, or the disappearance of predetermined signals, that trigger the authorization unit to take certain action. For example, the predetermined signals may represent the GPS coordinates outside of a safe area, or a radio signal informing the authorization unit that the drive is in possession of a thief, or the disappearance of a light signal in an optical fiber, etc. Upon receiving these signals, the authorization unit knows that the environment is unsafe.

Figure 3:
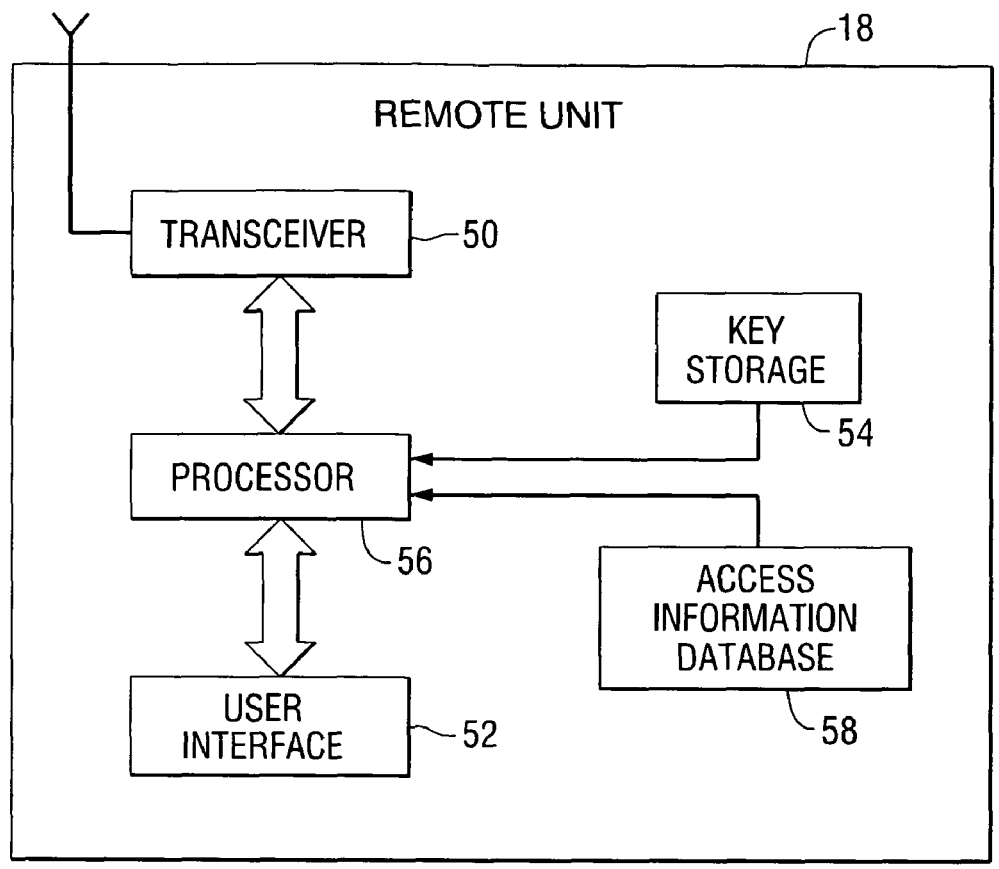
FIG. 3 is a block diagram of a remote unit constructed in accordance with the invention.

FIG. 3 is a block diagram of a remote unit 18. The remote unit includes a transceiver 50 for transmitting information to the authorization unit and for receiving information from the authorization unit. A user interface 52 is provided to enter commands. A memory 54 is used to store information, including, for example, a key to be used by the encoder in the authorization unit to encrypt and to decrypt data. A processor 56 receives the user commands and controls the operation of the transceiver. The remote unit may contain access control information 58, such as user access rights (if the users are required to log in), and information on safety rules (which conditions are considered safe, what kind of distress signals shall be sent if the conditions are unsafe, etc.). Alternatively, the remote unit may access a remote database that includes the access control information.

The external signals used for communication between the remote unit and the authorization unit can be divided into global signals (for example, GPS, satellite radio, cellular phone networks, or proprietary transmitters) and local signals (for example, weak radio transmitters, laser links, or wired connections).

The global signals may take the advantage of already available infrastructure and are accessible worldwide or region-wide. However, the signal parameters (frequency, etc.) are generally known, and may be used by an adverse party to disrupt the communications.

For example, a one-way global signal from a GPS receiver associated with the authorization unit can describe the disc drive's location and can be used to lock the disc drive if it leaves a predefined permitted area. In this example, the drive contains a GPS receiver that provides the current coordinates to the authorization unit. The authorization unit then compares these coordinates with a permitted range, and will stop drive operation (e.g., by erasing the keys) if the drive is outside of the permitted range. The allowed coordinates and the specifics of stopping the drive operation can be loaded in the drive from the remote unit before it is sent out to the field. A GPS signal can also be used to track a stolen disc drive.

Two-way communication via a cellular connection offers even greater flexibility. For example, it can be used for user authorization, for sending/receiving a distress signal, for providing tracking information if the drive is equipped with a GPS receiver, etc.

This invention also encompasses a scenario where the drive operation is remotely controlled but there is no encoding. For example, if the computer, whose hard drive's authorization unit is equipped with the cellular transceiver, is stolen and the owner finds out about it, the owner can send (or instruct the third party who controls the remote unit) an instruction to the authorization unit, which will block the drive communication with the host computer. In this case, the information is protected against a thief who does not have specialized equipment for the low-level analysis of the disc surface. Furthermore, this embodiment can include the tracking capabilities, etc.

In this implementation, the hard disk drive equipped with a cellular transceiver controls access to its data by checking the user identification and password at the remote unit. Since the user rights database is not contained on the host computer, and the computer is not connected to it via the computer network, it is impossible to steal or hack into. In addition, such approach allows secure logging of the user actions.

Local signals, being short range, are more difficult to intercept and analyze than the global signals, which improves the security. Local signals can be used, for example, to control the access to data within an office, airplane, or a submarine. The local signal may be wireless (for example, a low power radio transmitter signal, or direct laser signal) or wired (for example, electric or optical signals).

Systems using local signals may be of interest when the global signals (GPS or cellular signal) are unavailable. A laser beam or low-intensity radio signal may be used to send an "OK" signal to nearby hard disc drives. While this signal is present, the drive is presumed to be safe. The loss of the signal (removal of disc drive away from a laser or a transmitter) could generate a distress signal and lock the disc drive.

Local signals can also serve as a backup for a global signal. For example, a disc drive installed on an aircraft can receive a false distress signal. In this case, the operator is notified and can confirm or cancel this signal. The false distress signal may be sent by an adverse party, or may be caused by the error in the signaling equipment. Thus, it is necessary to design a way to cancel the false distress signals.

When the drive receives the distress signal, the operator can be notified, for example via a visual or sound signal (light or buzzer). There are several ways to notify the operator, including using the means built into the drive, and using the computer to which the drive is connected. In the first case, the drive includes some type of signaling device, such as a light source and/or a speaker, which will activate if the distress signal is received. In the second case, the host computer includes software (or hardware) capable of detecting the message sent by a hard drive when the distress signal is received, and informing the operator (for example, by a message, light, sound, etc.).

To cancel a false distress signal, the operator can perform some action that cannot be done remotely (that is, which cannot be faked by the adverse party), such as pressing a "Cancel" button on the drive or in the software, or entering a certain code. In the case where the adverse party sends the false distress signal continuously, this "cancel status" can be valid for a certain time interval (short) and will cause the drive to ignore an identical distress signal received during this period.

The decoding key may be received via both global and local signals. The global signals offer better safety because they ensure that the sensitive data (keys) are stored remotely and are always controlled by the data owner.

This invention secures the information in the storage device, and utilizes the wireless connection to control the operation of the storage device. Numerous variations of the described system are possible. For example, consider a consumer disc drive equipped with a GPS device. In this case, the authorization unit constantly monitors the location of the disc drive. The disc drive can be locked when the GPS coordinates are outside the allowed area. To lock the drive, the authorization unit can erase the decoding key if the drive GPS coordinates are outside of the permitted area.

The drives may also be equipped with a cellular phone transceiver, which can inform the owner of the wrong location and send out the coordinates of the location of the drive. The drive can find out its coordinates from the GPS, compare them with the permitted range, and then send the coordinates via the cell phone transceiver.

In another example, the disc drive can be operated in accordance with controlled user access rights. In this example, the smart disc drive is equipped with a two-way communications device (such as a cell phone). The data are encoded using the key that is a combination of the master key and an individual key. The master key would be loaded into the authorization unit under conditions when it cannot be intercepted, for example, when the drive is located at the home base. In order to access the data, the operator has to enter the user ID and password (on a host computer), which are sent to the remote unit via the wireless link. The user ID and password are verified at the remote unit, and the corresponding individual key is sent from the remote unit to the drive. This approach offers the following advantages: (1) the entire key is never transmitted and thus cannot be intercepted; (2) unlike in a situation when a user owns a part of the decoding key, this implementation offers control over the user access rights on the side of the remote unit; and (3) user access to the drive can be logged. Such an approach provides an additional degree of protection and may be useful for the highly sensitive business and military data.

Figure 4:
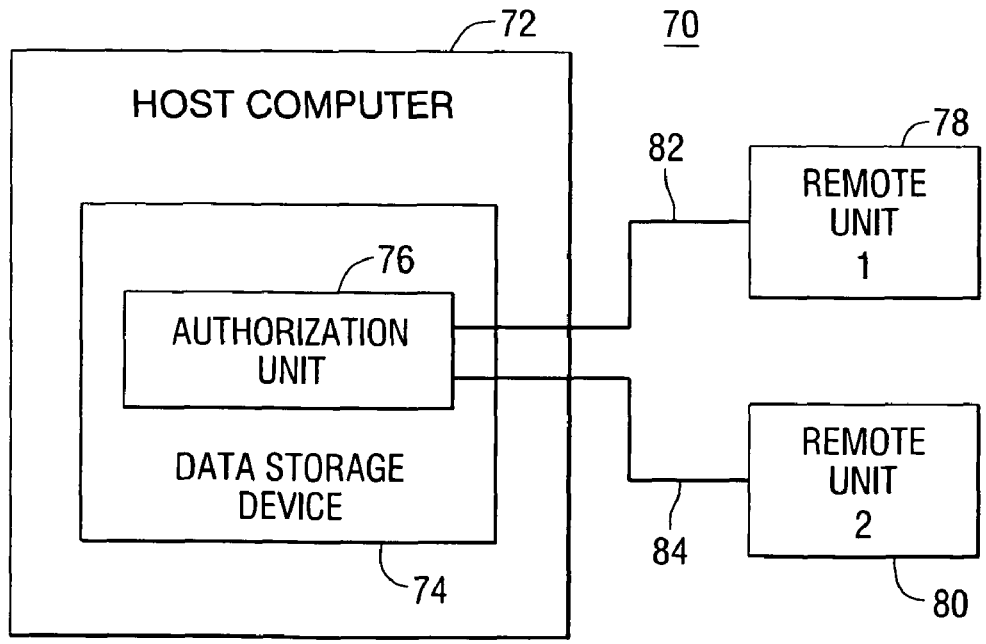
FIG. 4 is a block diagram of an alternative computer system that includes the invention.

In another embodiment, the disc drive receives information from one global source (GPS) and two local sources. FIG. 4 is a block diagram of a computer system 70 constructed in accordance with this embodiment. The system includes a computer 72 having a data storage device 74, such as a hard disc drive. An authorization unit 76 is associated with the data storage device. The authorization unit is capable of communicating with two remote units 78 and 80. Communication between the authorization unit and the remote units is accomplished via wired connections 82 and 84. Alternatively, wireless communication links can also be used. One of the remote units can provide a control signal to the authorization unit in response to spatial coordinates of the disc drive. For example, if the drive is removed from a designated area, the remote unit can provide a control signal to the authorization unit to prevent access to the drive, or to corrupt the content of the drive.

The local remote sources can provide an operator controlled "OK" channel (remote unit 78) and the information from some other signal source such as an altimeter (remote unit 80). If the system is located on an aircraft, the authorization unit would be programmed to monitor the location and altitude of the aircraft. Then, if the aircraft goes below a predetermined altitude in a predetermined area (for example as determined by a GPS receiver), the operator can be warned and after a certain delay, the encoding keys and/or data can be destroyed. In case of an error, the operator can manually override the system by sending an "OK" signal.

The invention provides component-level data protection. In the case of a disc drive, the drive itself protects its data. Security settings are flexible and well protected. Since the access rules are stored remotely and not in the storage device, it is impossible to hack them. Moreover, the access rules can be modified at any time depending on circumstances. The invention also provides improved protection of the encrypted data. More specifically, the decoding keys are not permanently stored on the hard drive and are supplied on an "as-needed" basis.

As opposed to computer networks, wireless external signals such as radio, GPS, or cellular can be received almost everywhere. Thus, the security features may be activated almost anywhere, even when a computer is not connected to the Internet. Safety features can be made inconspicuous (without additional wires, etc.). Thus a thief may not be able to counteract the security actions in a timely manner. The invention may be used as a subscription service and thus generate subscription revenue.

In case the drive is stolen, lost or captured, the external signals (or their disappearance) will lock the disc drive. To protect the data against the disc surface analysis, the data is encrypted with the key, which is provided remotely and is erased in an emergency, thus precluding reverse engineering. To decrease the chance of intercepting the decoding keys, the key can be periodically changed, and the data re-encoded.

To prevent access to data stored on the storage medium, the transmission of the data between the storage device and the computer bus can be blocked by software or electronics; the decoding key can be destroyed; or the existing encoded data can be overwritten to make decoding impossible. The storage medium need not be physically destroyed. The remote unit controls the authorization unit and is located outside of the computer and the data storage system. A password/user ID can be sent to the remote unit for evaluation. The remote unit is controlled by the data owner, who may be someone different from the operator.

For highly sensitive uses, the disc drive may also be programmed to corrupt the data upon confirmation of the distress signal. In some embodiments, access rights of individual users can be controlled using two-way communications.

While the invention has been described in terms of several embodiments, it will be apparent to those skilled in the art that various changes can be made to the described embodiments without departing from the scope of the invention as set forth in the following claims.

What is claimed is:

1. An apparatus comprising:
   a data storage device including a data storage medium;
   a first remote unit; and
   an authorization unit within the data storage device for encrypting information to be stored on the data storage medium using a key received from the first remote unit, wherein the key is stored in volatile memory in the data storage device.

2. The apparatus of claim 1, wherein the authorization unit comprises:
   a processor for encrypting information to be stored on the storage medium; and
   the key comprises a private key for use by the processor.

3. The apparatus of claim 2, wherein the authorization uses a combination of the private key and a public key for encrypting information to be stored on the storage medium.

4. The apparatus of claim 1, further comprising:
   a transmitter for transmitting information about a status of the data storage device to the first remote unit.

5. The apparatus of claim 1, wherein the remote unit comprises:
   a user interface;
   a key memory;
   a transmitter; and
   a processor for controlling the transfer of a key from the key memory to the transmitter in response to the user interface.

6. The apparatus of claim 1, wherein the remote unit communicates with the authorization unit over a wireless channel.

7. The apparatus of claim 1, further comprising:
   a second remote unit for providing an access control signal to the authorization unit in response to an altimeter.

8. The apparatus of claim 1, further comprising:
   a second remote unit for providing an access control signal to the authorization unit in response to spatial coordinates of the apparatus.

9. The apparatus of claim 1, wherein the remote unit further comprises:
   a signaling device; and
   an override device.

10. The apparatus of claim 1, wherein the key is lost when the data storage device shuts down or loses power.

11. The apparatus of claim 1, wherein the remote unit contains a user rights database.

12. A method comprising:
    using an authorization unit within a data storage device to encrypt data to be stored on a data storage medium using a key received from a first remote unit, wherein the key is stored in volatile memory in the data storage device.

13. The method of claim 12, wherein the key is lost when the data storage device shuts down or loses power.

14. The method of claim 12, wherein the key comprises a private key.

15. The method of claim 14, wherein the authorization unit uses a combination of the private key and a public key for encrypting information to be stored on the storage medium.

16. The method of claim 12, wherein the remote unit comprises:
    a user interface;
    a key memory;
    a transmitter; and
    a processor for controlling the transfer of key data from the key memory to the transmitter in response to the user interface.

17. The method of claim 12, further comprising:
    using a second remote unit to provide an access control signal to the authorization unit in response to an altimeter.

18. The method of claim 12, further comprising:
    using a second remote unit to provide an access control signal to the authorization unit in response to spatial coordinates of the apparatus.

19. The method of claim 12, wherein the key that is changed on a regular or irregular basis.

20. The method of claim 12, wherein the authorization unit corrupts data stored on the storage medium in response to a distress signal.

* * * * *